United States Patent
Patnaik et al.

(10) Patent No.: US 11,816,992 B2
(45) Date of Patent: Nov. 14, 2023

(54) REAL TIME FLEET MANAGEMENT FOR AUTONOMOUS VEHICLES USING PUDDLE MAPPING

(71) Applicant: Waymo LLC, Mountain View, CA (US)

(72) Inventors: Vijaysai Patnaik, San Francisco, CA (US); Robert Chen, San Francisco, CA (US)

(73) Assignee: Waymo LLC, Mountain View, CA (US)

(*) Notice: Subject to any disclaimer, the term of this patent is extended or adjusted under 35 U.S.C. 154(b) by 170 days.

(21) Appl. No.: 16/935,266

(22) Filed: Jul. 22, 2020

(65) Prior Publication Data

US 2022/0028277 A1    Jan. 27, 2022

(51) Int. Cl.
*G08G 1/00* (2006.01)
*G08G 1/0967* (2006.01)

(52) U.S. Cl.
CPC ....... *G08G 1/207* (2013.01); *G08G 1/096775* (2013.01); *G08G 1/22* (2013.01)

(58) Field of Classification Search
None
See application file for complete search history.

(56) References Cited

U.S. PATENT DOCUMENTS

| | | | |
|---|---|---|---|
| 8,306,672 B2 | 11/2012 | Nickolaou | |
| 9,469,307 B2 * | 10/2016 | Solyom | B60W 10/18 |
| 9,665,100 B2 | 5/2017 | Shashua et al. | |
| 9,733,096 B2 * | 8/2017 | Colijn | G01C 21/3438 |
| 10,338,594 B2 * | 7/2019 | Long | G05D 1/0055 |
| 10,486,485 B1 * | 11/2019 | Levinson | B60G 17/0162 |
| 11,017,674 B1 * | 5/2021 | Patterson | G05D 1/0297 |
| 2014/0062725 A1 * | 3/2014 | Maston | G08G 1/0112 340/905 |
| 2014/0067265 A1 * | 3/2014 | Maston | G01C 21/3492 701/533 |
| 2014/0277902 A1 * | 9/2014 | Koch | G07C 5/008 701/29.1 |
| 2014/0307247 A1 * | 10/2014 | Zhu | G01S 13/867 356/4.01 |
| 2015/0347478 A1 * | 12/2015 | Tripathi | G06F 16/2246 707/743 |
| 2017/0067750 A1 * | 3/2017 | Day | G08G 1/096716 |
| 2017/0144669 A1 * | 5/2017 | Spata | E01C 23/01 |
| 2017/0336792 A1 * | 11/2017 | Gdalyahu | B62D 15/025 |
| 2019/0051153 A1 * | 2/2019 | Giurgiu | G01C 21/3841 |
| 2020/0079381 A1 * | 3/2020 | Lombrozo | G05D 1/0276 |
| 2020/0192403 A1 * | 6/2020 | Silver | B60W 10/20 |
| 2020/0386572 A1 * | 12/2020 | Kubertschak | G01C 21/3602 |

FOREIGN PATENT DOCUMENTS

JP    2009199154 A    9/2009

* cited by examiner

*Primary Examiner* — Maceeh Anwari
*Assistant Examiner* — Aarron E Santos
(74) *Attorney, Agent, or Firm* — Botos Churchill IP Law

(57) ABSTRACT

The disclosure relates to managing a fleet of autonomous vehicles. For instance, a method may include receiving, from a plurality of the autonomous vehicles of the fleet, reports identifying locations of detected puddles. A miles per puddle rate may be determined based on the received reports. An operating policy for the fleet may be determined based on the miles per puddle rate. An instruction may be sent to one or more of the autonomous vehicles of the fleet in order to implement the operating policy.

21 Claims, 10 Drawing Sheets

REAL TIME FLEET MANAGEMENT FOR AUTONOMOUS VEHICLES USING PUDDLE MAPPING

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. Autonomous vehicles are equipped with various types of sensors in order to detect objects in the surroundings. For example, autonomous vehicles may include sonar, radar, camera, LIDAR, and other devices that scan and record data from the vehicle's surroundings.

SUMMARY

Figure 1:
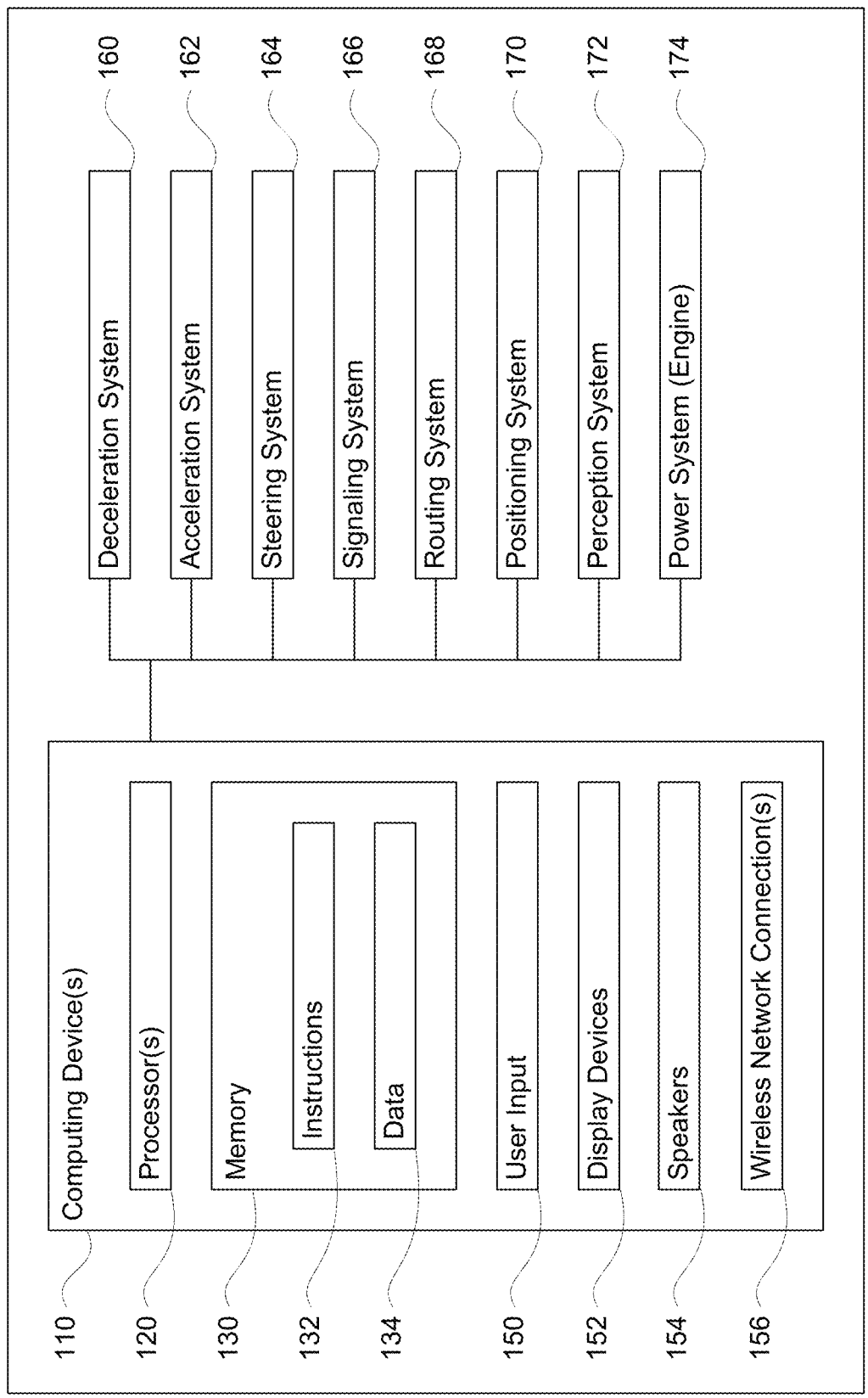
FIG. 1 is a functional diagram of an example vehicle in accordance with an exemplary embodiment.

Aspects of the disclosure provide a method for managing a fleet of autonomous vehicles. The method includes receiving, by one or more server computing devices from a plurality of the autonomous vehicles of the fleet, reports identifying locations of detected puddles; determining, by the one or more server computing devices, a miles per puddle rate based on the received reports; determining, by the one or more server computing devices, an operating policy for the fleet based on the miles per puddle rate; and sending, by the one or more server computing devices, an instruction to one or more of the autonomous vehicles of the fleet in order to implement the operating policy.

In one example, the method also includes receiving an addition report from a vehicle operated by a driver in a manual driving mode, and wherein the miles per puddle rate is further based on the additional report. In another example, the reports further include dimensions of the detected puddles, and the method also includes determining a no-go region where the autonomous vehicles of the fleet are not permitted to drive based on dimensions of one of the detected puddles and sending, by the one or more server computing devices, the no-go region to the autonomous vehicles of the fleet in order to cause the autonomous vehicles of the fleet to avoid the no-go region. In one example, the reports exclude puddles located in certain types of areas. In this example, the certain types of areas include speed dips in residential areas. In addition or alternatively, the certain types of areas include areas outside of driving lanes. In another example, the method also includes incorporating the detected puddles into map information. In this example, the method also includes sending information about the detected puddles to ones of the autonomous vehicles of the fleet in order to cause the ones to update local versions of the map information at the respective ones. In this example, the method also includes receiving from a predetermined number of the autonomous vehicles of the fleet a report that one of the detected puddles of the local versions of the map information is no longer detected and in response to receiving from the predetermined number of the autonomous vehicles of the fleet a report that the one of the detected puddles of the local versions of the map information is no longer detected, removing the one of the detected puddles from the map information. In addition, the method also includes sending information about the removed one of the detected puddles to the ones in order to cause updates to the local versions of the map information at the ones. In addition or alternatively, after a period of time, removing a detected puddle from the map information. In this example, the method also includes sending information about the removed detected puddle to ones of the autonomous vehicles of the fleet in order to cause updates to local versions of the map information at the ones. In addition or alternatively, the method also includes monitoring locations of the autonomous vehicles of the fleet over time; determining, based on the monitoring, when a predetermined number of the autonomous vehicles of the fleet have passed one of the detected puddles in the map information without reporting a detected puddle; and when the predetermined number of the autonomous vehicles of the fleet have passed one of the detected puddles in the map information without reporting a detected puddle, removing the one of the detected puddles from the map information. In this example, the method also includes sending information about the removed one of the detected puddles to ones of the autonomous vehicles of the fleet in order to cause updates to local versions of the map information at the ones. In another example, the miles per puddle rate is determined further based on a window corresponding to a number of miles driven by the autonomous vehicles. In another example, the miles per puddle rate is determined further based on a window corresponding to a period of time since a last precipitation event. In another example, the miles per puddle rate is determined further based on a window corresponding to a fixed period of time. In another example, the method also includes continuously updating the mile per puddle rate as new reports of detected puddles are received from the autonomous vehicles of the fleet. In another example, determining the operating policy includes comparing the miles per puddle rate to a threshold value. In this example, the method also includes determining when the updated mile per puddle rate does not meet the threshold value and when the updated mile per puddle rate is determined to not meet the threshold value, sending, by the one or more server computing devices, an instruction to one or more of the autonomous vehicles of the fleet in order to no longer implement the operating policy.

DETAILED DESCRIPTION

Overview

The technology relates to managing operation of autonomous vehicles of a fleet using real time mapping of puddles.

This information can be used, among other things, to understand the extent and nature of puddles and dampness on roads post rain, which in turn, can be used to manage operation of autonomous vehicles. Detecting wet roads during and after rain in different areas may be determined or estimated relatively easily. However, wet roads will dry via evaporation much faster than many puddles. In some instances, the autonomous vehicles of the fleet may be used to detect puddles using various techniques. This information may be reported to a backend system which tracks puddles using a map. In addition, the backend system may aggregate data received from a plurality of vehicles to determine a miles per puddle rate. This miles per puddle rate may be used, for example, to assess the state of the world and to make decisions for the autonomous vehicles of the fleet.

The computing devices of autonomous vehicles may detect puddles in various ways. In addition, in some instances, after a rain or other precipitation event, the autonomous vehicles as well as other vehicles, for example operated by a driver in a manual driving mode, may be sent on scouting missions. The driver and/or another occupant of the vehicle may then visually detect puddles and input this information into a computing device to be sent to the backend system.

The backend system may include one or more server computing devices. These server computing devices may access and update a map of puddles. In this regard, the server computing devices may insert puddles into the map information based on the location and dimensions of the puddles as they are received. In addition, the server computing devices may broadcast updates to all autonomous vehicles of the fleet identifying new puddles. In addition to adding new puddles to the map information, the server computing devices may also remove old puddles.

In addition to mapping puddles, the server computing devices may also aggregate data received from the autonomous vehicles of the fleet in order to track a "miles per puddle" rate. This miles per puddle rate may correspond to the number of puddles observed by the autonomous vehicles of the fleet over a certain period of time or number of miles driven.

This miles per puddle rate may then be used by the server computing devices to make decisions for the fleet. The server computing devices may use the miles per puddle rate to implement operating policies. By doing so, the server computing devices are able to aggregate data across a plurality of vehicles and more readily provide an estimate of what the world currently looks like.

The features described herein may provide for a useful and practical approach to real time mapping of puddles. As noted above information can be used, among other things, to understand the extent and nature of puddles and dampness on roads post rain, which in turn, can be used to manage operation of autonomous vehicles.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

The computing devices 110 may also be connected to one or more speakers 154, user inputs 150, and display devices 152. The user input may include a button, touchscreen, or other devices that may enable an occupant of the vehicle, such as a driver or passenger, to provide input to the computing devices 110 as described herein. For example, a passenger may be able to provide information about a puddle as discussed further below. The display devices may include any number of different types of displays including monitors, touchscreens or other devices that may enable the vehicle to provide information to or request information from a passenger.

In one aspect the computing devices 110 may be part of an autonomous control system capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, routing system 166, planning system 168, positioning system 170, and perception system 172 in order to control the movement, speed, etc. of vehicle 100 in accordance with the instructions 132 of memory 130 in the autonomous driving mode. In this regard, each of these systems may be one or more processors, memory, data and instructions. Such processors, memories, instructions and data may be configured similarly to one or more processors 120, memory 130, instructions 132, and data 134 of computing device 110.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle.

Planning system 168 may be used by computing devices 110 in order to determine and follow a route generated by a routing system 166 to a location. For instance, the routing system 166 may use map information to determine a route from a current location of the vehicle to a drop off location. The planning system 168 may periodically generate trajectories, or short-term plans for controlling the vehicle for some period of time into the future, in order to follow the route (a current route of the vehicle) to the destination. In this regard, the planning system 168, routing system 166, and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In addition, the map information may identify area types such as constructions zones, school zones, residential areas, parking lots, etc.

The map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Figure 2:
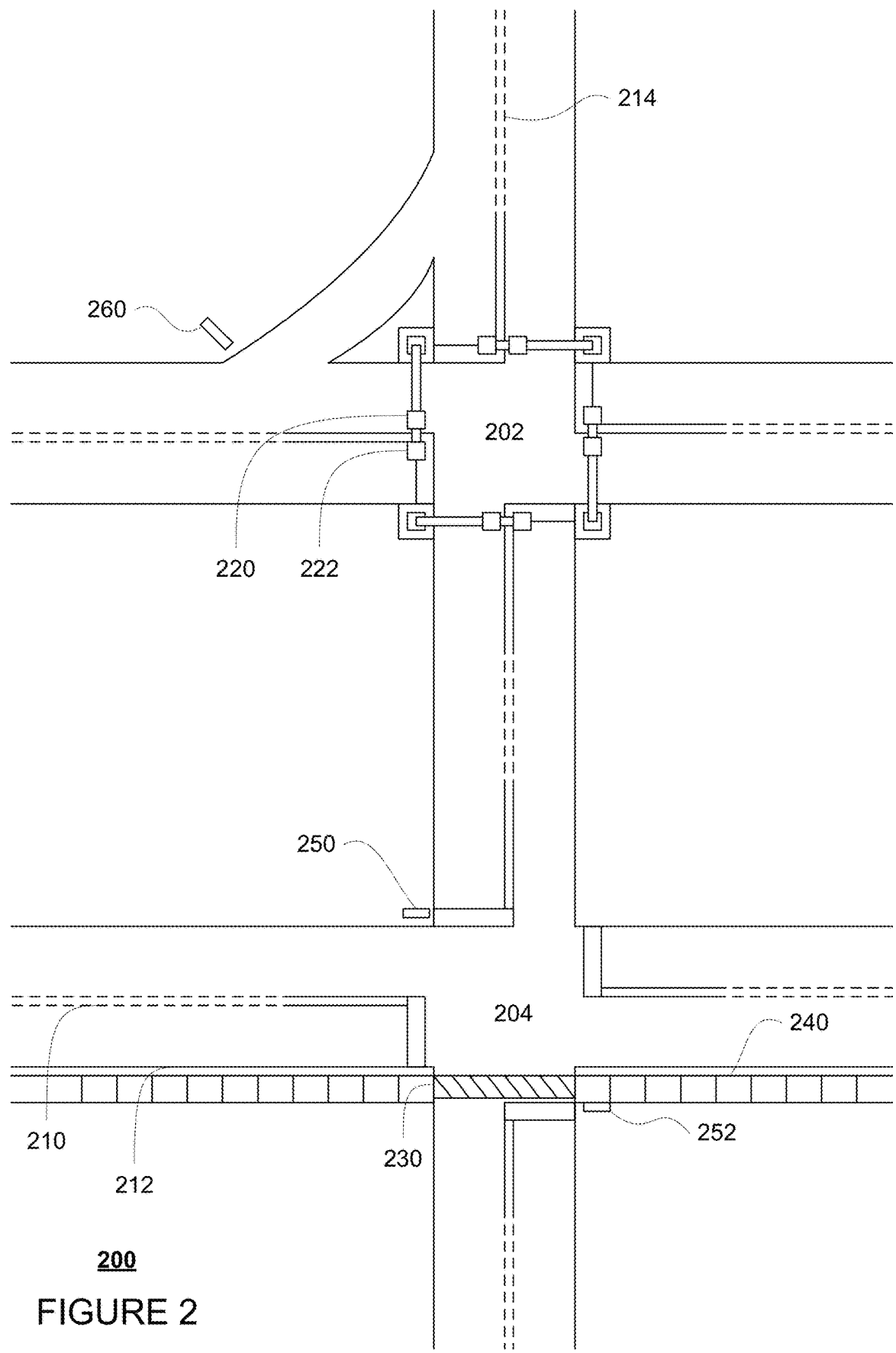
FIG. 2 is an example of map information in accordance with aspects of the disclosure.

FIG. 2 is an example of map information 200 for a section of roadway including intersections 202, 204. The map information 200 may be a local version of the map information stored in the memory 130 of the computing devices 110. Other versions of the map information may also be stored in the storage system 450 discussed further below. In this example, the map information 200 includes information identifying the shape, location, and other characteristics of lane lines 210, 212, 214, traffic lights 220, 222, crosswalk 230, sidewalks 240, stop signs 250, 252, and yield sign 260. In this regard, the map information includes the three-dimensional (3D) locations of traffic lights 220, 222 as well as information identifying the lanes which are controlled by these traffic lights.

While the map information is depicted herein as an image-based map, the map information need not be entirely image based (for example, raster). For example, the map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map and/or on the earth. The positioning system 170 may also include a GPS receiver to determine the device's latitude, longitude and/or altitude position relative to the Earth. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The positioning system 170 may also include other devices in communication with the computing devices of the computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 3:
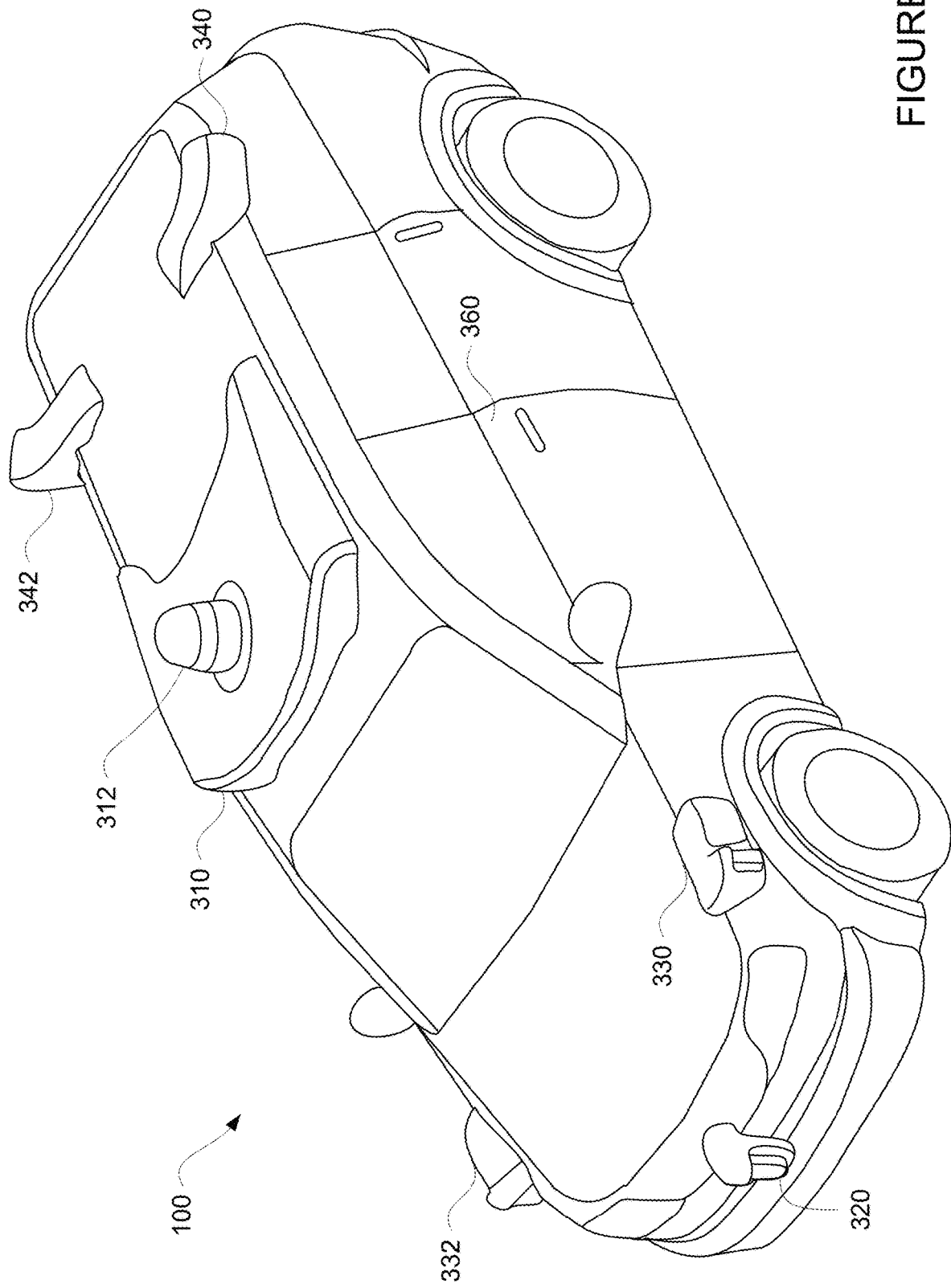
FIG. 3 is an example diagram of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, routing system 166, planning system 168, positioning system 170, perception system 172, and power system 174 (i.e. the vehicle's engine or motor) in order to control the movement, speed, etc. of vehicle 100 in accordance with the instructions 132 of memory 130.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their features. These features may include location, type, heading, orientation, speed, acceleration, change in acceleration, size, shape, etc. In some instances, features may be input into a behavior prediction system software module which uses various behavior models based on object type to output a predicted future behavior for a detected object.

In other instances, the features may be put into one or more detection system software modules, such as a traffic light detection system software module configured to detect the states of known traffic signals, a school bus detection system software module configured to detect school busses, construction zone detection system software module configured to detect construction zones, a detection system software module configured to detect one or more persons (e.g. pedestrians) directing traffic, a traffic accident detection system software module configured to detect a traffic accident, an emergency vehicle detection system configured to detect emergency vehicles, etc. Each of these detection system software modules may input sensor data generated by the perception system 172 and/or one or more sensors (and in some instances, map information for an area around the vehicle) into various models which may output a likelihood of a certain traffic light state, a likelihood of an object being a school bus, an area of a construction zone, a likelihood of an object being a person directing traffic, an area of a traffic accident, a likelihood of an object being an emergency vehicle, etc., respectively.

Detected objects, predicted future behaviors, various likelihoods from detection system software modules, the map information identifying the vehicle's environment, position information from the positioning system 170 identifying the location and orientation of the vehicle, a destination for the vehicle as well as feedback from various other systems of the vehicle may be input into a planning system software module of the planning system 168. The planning system may use this input to generate trajectories for the vehicle to follow for some brief period of time into the future based on a current route of the vehicle generated by a routing module of the routing system 166. A control system software module of the computing devices 110 may be configured to control movement of the vehicle, for instance by controlling braking, acceleration and steering of the vehicle, in order to follow a trajectory.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 172 to detect and respond to objects when needed to reach the location safely. Again, in order to do so, computing device 110 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g. by using turn signals). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
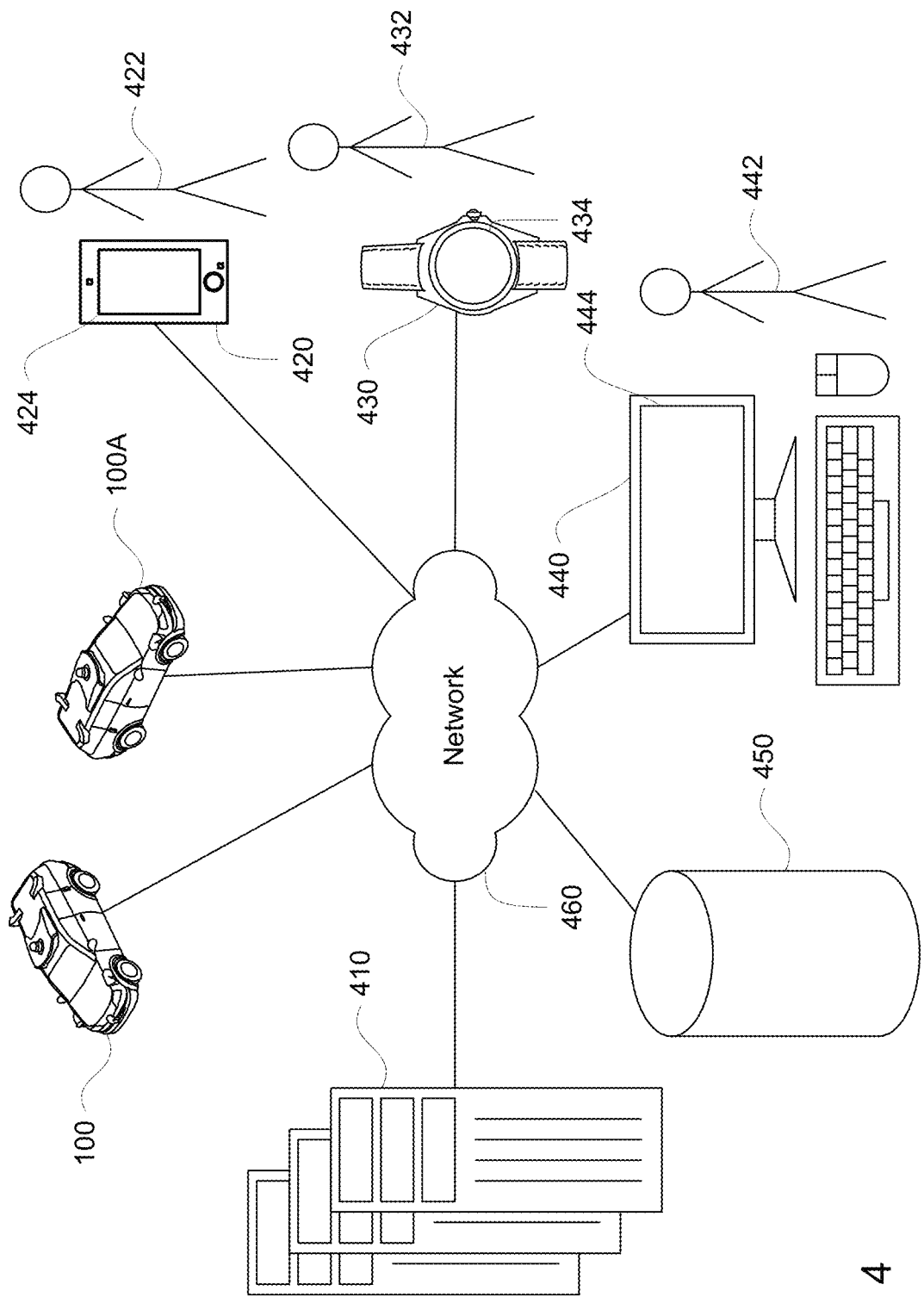
FIG. 4 is an example pictorial diagram of a system in accordance with aspects of the disclosure.
Figure 5:
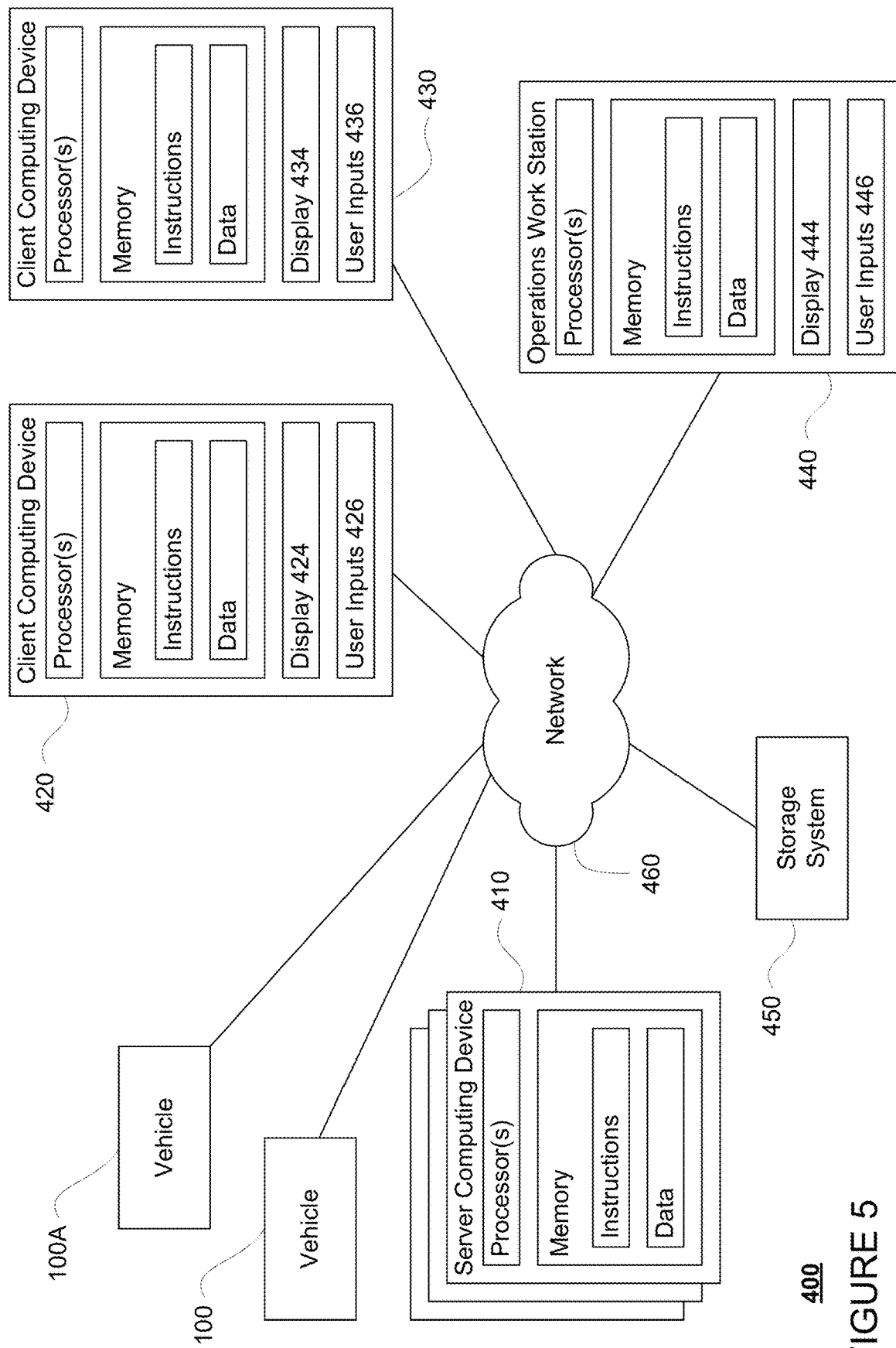
FIG. 5 is an example functional diagram of a system in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicles 100, 100A which may be configured the same as or similarly to vehicle 100. In this regard, vehicles 100, 100A may be considered a fleet of autonomous vehicles. Although only a few vehicles and computing devices are depicted for simplicity, a typical fleet and/or system may include significantly more.

As shown in FIG. 4, each of computing devices 410, 420, 430, 440 may include one or more processors, memory, instructions and data. Such processors, memories, data and instructions may be configured similarly to one or more processors 120, memory 130, instructions 132 and data 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a validation computing system which can be used to validate autonomous control software which vehicles such as vehicle 100 and vehicle 100A may use to operate in an autonomous driving mode. In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

In some examples, client computing device 440 may be an operations workstation used by a human labeler, an administrator or other operator. Although only a single operations workstation 440 is shown in FIGS. 4 and 5, any number of such work stations may be included in a typical system. Moreover, although operations workstation is depicted as a desktop computer, operations work stations may include various types of personal computing devices such as laptops, netbooks, tablet computers, etc.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. For example, the storage system 450 may store various classifiers or machine learning models such as neural networks, decision trees, etc. for detecting and identifying various features in a vehicle's environment including puddles, splashes, wet roads, as well as characteristics of those puddles and splashes as discussed further below.

As another example, storage system 450 may store log data generated by a vehicle, such as vehicle 100, when operating in the autonomous driving mode or other driving modes. In this regard, the log data may identify certain events experienced by the vehicle and logged by the computing devices 110, such as swerving, hydroplaning, etc. The log data may also include information output by various systems of the vehicle described herein as well as information input by an occupant of the vehicle, for example, regarding puddles as described herein. The log data may also include sensor data, such as LIDAR sensor data points, camera images, etc., generated by sensors of a perception system of vehicles of the fleet of vehicles (e.g. vehicles 100 and 100A). This sensor data may include information identifying other objects such as the location, size and speed of other vehicles.

At least some of this log data may be associated with labels. Some of these labels may include information identifying the aforementioned other objects, such as other vehicles, as well as their characteristics, such as the location, size and speed. At least some of these labels may be provided by human operators identifying the length, width and position of puddles. For instance, human operators may label the location of puddles in images by reviewing the images and drawing bounding boxes around the puddle. These labels may be used to train a classifier for detecting and identifying puddles and their characteristics (e.g. shape, length, width, position, etc.). Others of the labels may be provided by human operators identifying characteristics of splashes such as the maximum height of the splash, the density of LIDAR sensor data points directly behind a tire and/or adjacent to the tire of another vehicle that caused the splash, as well as the duration of the splash or the period of time between when the splash "starts" and "ends". These and other labels discussed further below may be used to train various classifiers for detecting and identifying splashes and their characteristics as discussed further below.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 10:
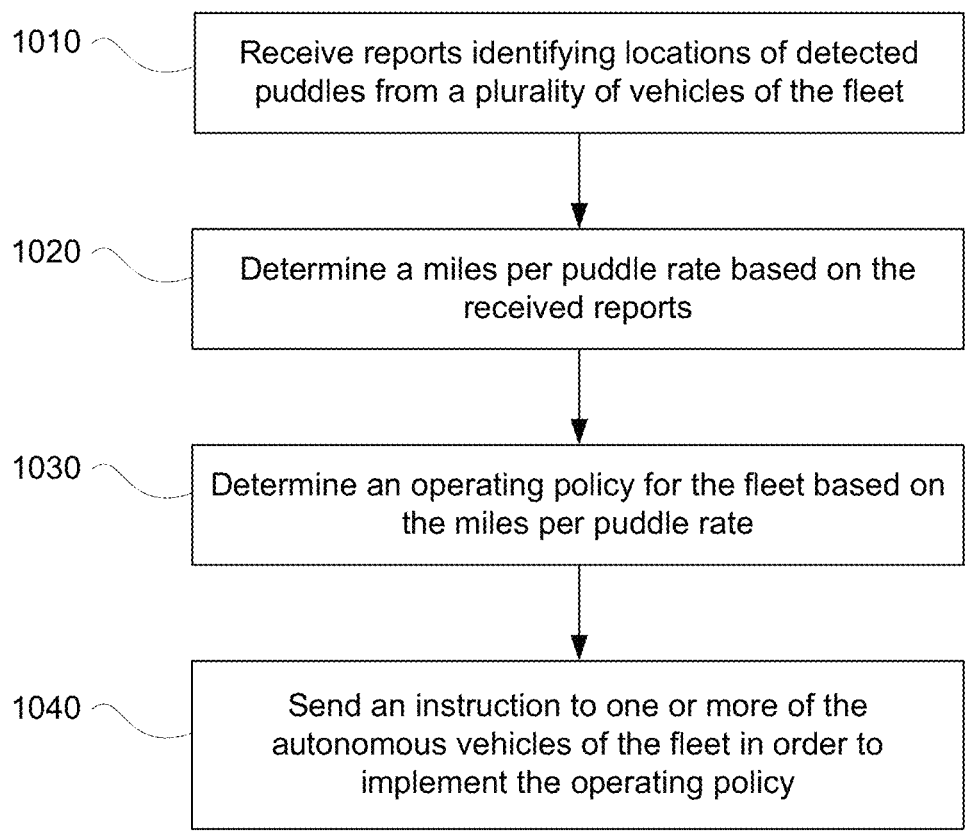
FIG. 10 is an example view of a portion of a vehicle and a puddle in accordance with aspects of the disclosure.

FIG. 10 includes an example flow diagram 1000 of some of the examples for managing a fleet of autonomous vehicles, such as vehicles 100, 100A, which may be performed by one or more processors such as processors of the server computing devices 410 and/or processors of the positioning system 170. For instance, at block 1010, reports identifying locations of detected puddles are received from a plurality of vehicles of the fleet.

The computing devices 110 of autonomous vehicles of the fleet, such as vehicles 100, 100A, may detect puddles in various ways. For example, a perception system 172 of each vehicle may constantly use sensor data such as images, LIDAR sensor data points, radar data, etc. to detect puddles including their size (e.g. dimensions) and location. In this regard, puddle detection may be continuous and not necessarily only after a rain or other precipitation event.

As one example, puddles or standing water may be detected using various techniques such as image classification techniques, reflectivity of LIDAR sensor data points, radar sensor data etc. For example, transmitted LIDAR signals that contact puddles may fail to reflect back to the sensor when the puddle is more than a certain distance from the sensor, such as 10 m, or more or less. Accordingly, a LIDAR sensor may produce little or no sensor data for locations where a puddle is present when the sensor is more than the certain distance from the puddle. The computing device 110 may determine that puddle is present in a location where no sensor data is present if the map information indicates a road surface is mapped at the location where no or little sensor data is present. The dimensions, for instance length and width, as well as an approximation of area, of the puddle may be determined by the computing device 110 from the received LIDAR signals and map information. In some instances, radar signals may be used by the computing devices to detect a puddle. For instance, a surface of a puddle may likely be in motion as the result of vibrations and wind, while road surfaces are typically stationary. In some instances, a classifier that detects wet roads can be used as a signal to increase the confidence in the detection of a puddle.

In addition or alternatively, a classifier may be used to determine whether an image captured by the vehicle's camera sensors includes a puddle. The model may include a classifier such as a neural network, a deep neural network, decision tree, boosting tree, etc. The training data for the model may be generated from the set of images in various ways. For instance, human operators may label the location of puddles in images by reviewing the images and drawing bounding boxes around the puddle. In addition or alternatively, existing models or image processing techniques may be used to label the location of puddles based on characteristics of puddles such as color, contrast, brightness, texture, etc. LIDAR signals, audio signals, and other such sensor data may also be used as training data. In some instances, the model may first be trained "offline" that is, ahead of time and/or at a remote computing device and thereafter sent and implemented at the vehicle. Given an image of a roadway including puddle, which may be considered a training input, and labels indicating puddle and the location of the puddle, which may be considered training outputs, the model may be trained to detect puddle and output the location of puddle found in a captured image. In this regard, training inputs and training outputs may be example inputs and outputs for the model used for training. Again, as noted above, another classifier that detects wet roads can be used as a signal to increase the confidence in the identification of a puddle by the model.

Figure 6:
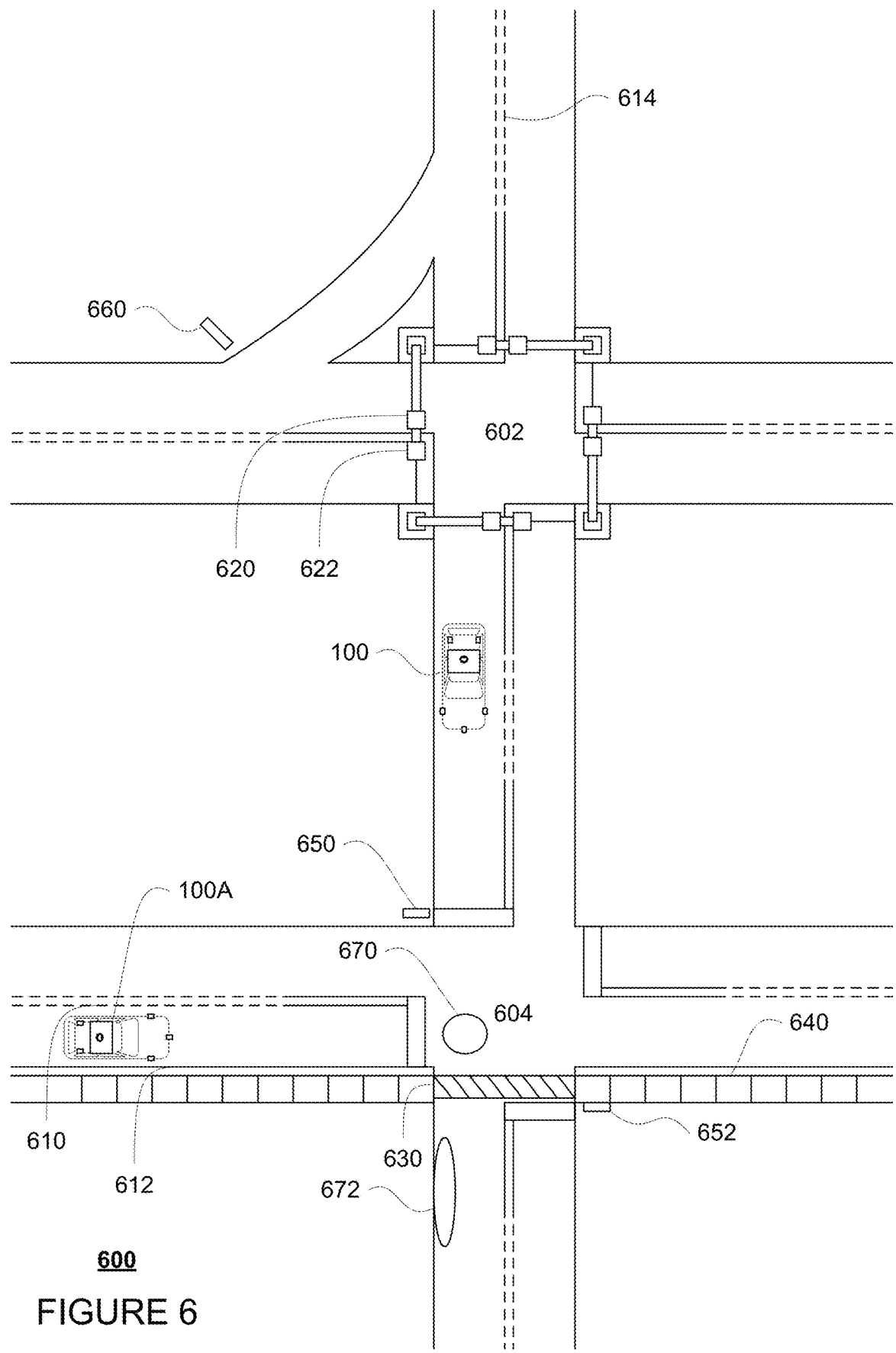
FIG. 6 is an example of a vehicle driving on a roadway in accordance with aspects of the disclosure.

FIG. 6 provides an example of vehicle 100 driving on a section of roadway 600 corresponding to the area of map information 200. In this regard, the shape, location and other characteristics of intersections 602, 604 correspond to the shape, location and other characteristics of intersections 202, 204. Similarly, the shape, location, and other characteristics of lane lines 610, 612, 614, traffic lights 620, 622, crosswalk 630, sidewalks 640, stop signs 650, 652, and yield sign 660, correspond to the shape, location, and other characteristics of lane lines 210, 212, 214, traffic lights 220, 222, crosswalk 230, sidewalks 240, stop signs 250, 252, and yield sign 260, respectively.

In this example, the vehicles 100 may detect puddles 670, 672 and vehicle 100A may detect puddle 670 (as puddle 672 may be partially occluded due to a curb or other object not depicted), for example, using the techniques described above. In this regard, not only may each of the vehicles detect the location of these puddles, but also characteristics of these puddles such as their dimensions (e.g. length and width relative to the direction of travel of the lane in which the puddle is located.

Figure 7:
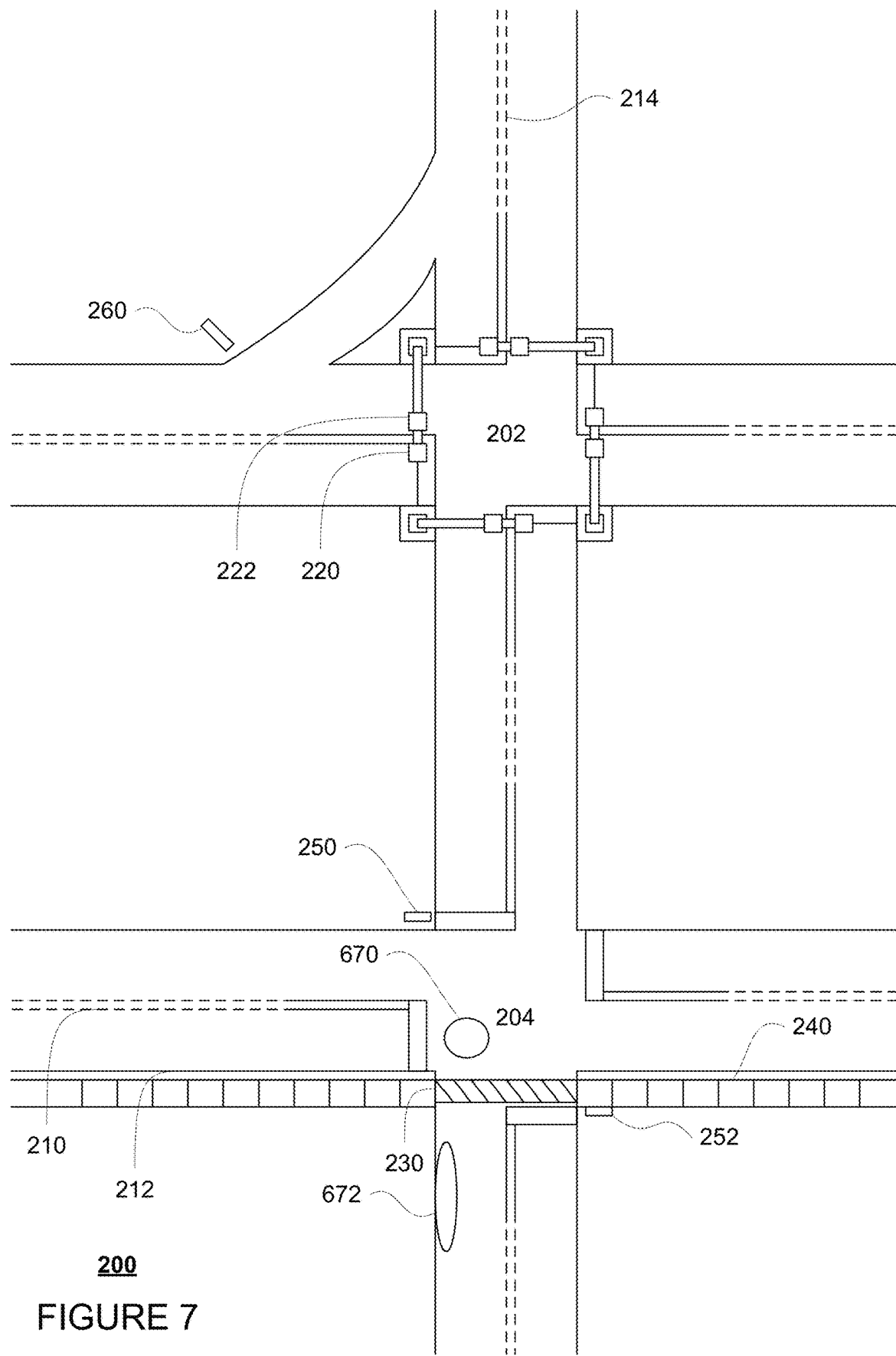
FIG. 7 is an example of map information in accordance with aspects of the disclosure.

Each time a puddle is detected, the computing devices 110 may add the puddle to map information stored locally at the vehicle. For example, turning to FIG. 7, vehicle 100 may insert the location and other characteristics of puddles 670,672 into a local version of the map information 200. Vehicle 100A would only insert the location and other characteristics of puddle 670 as vehicle 100A would not have detected puddle 672.

Details about puddles can be sent to and received by a remote computing device, such as server computing devices 410 or another computing device, for use. For example, vehicle 100 may report information about puddles 670, 672 including their locations and other characteristics to the server computing devices 410. Similarly, vehicle 100A may report information about puddle 670 including the puddle's location and other characteristics to the server computing devices 410. In addition to information about puddles, the vehicles may report other telemetry information such as the vehicle's location, orientation, heading, current route, current destination, etc., to the server computing devices 410. Other information about the status of the vehicle, such as whether automatic wipers are currently operating may also be reported to the server computing devices.

In some instances, after a rain or other precipitation event, the autonomous vehicles of the fleet (including vehicles 100, 100A) as well as other vehicles, for example operated by a driver in a manual driving mode, may be sent on scouting missions. That is, these vehicles may be tasked with driving certain routes through areas to be scouted such as all 40 and 45 mile per hour or greater roads (in both directions), a minimum number of miles in a certain region (e.g. 20 miles or 20 miles in at least 3 separate regions), etc. The driver and/or another occupant of the vehicle may then visually detect puddles and input this information into a computing device, such as computing devices 110 or another computing device, to be sent to the server computing devices 410. Alternatively, a perception system 172 of the vehicles 100, 100A may automatically detect puddles and send this information to the server computing devices 410. These additional reports can be used to determine the miles per puddle rate as discussed further below.

In some examples, the server computing devices 410 can build a map of puddles. In this regard, the server computing devices may insert puddles into a version of the map information 200 stored in the storage system 450 based on the location and dimensions of the puddles as they are received as in the example of FIG. 7. In addition, the server computing devices may broadcast updates, for example using network 460, to all autonomous vehicles of the fleet (e.g. to both of vehicles 100, 100A) identifying newly detected puddles, such as puddles 670, 672. These broadcasts may be limited to autonomous vehicles with locations nearby such new puddles and/or routes that pass through such puddles, etc. As such, the computing devices of any autonomous vehicles that receive these updates may incorporate these puddles into their local map information. In this regard, even though not detected by vehicle 100A, vehicle 100A may receive a broadcast update from the server computing device 410 identifying the location and other characteristics of the puddle 672 and may insert this information into a local version of the map information 200.

Figure 8:
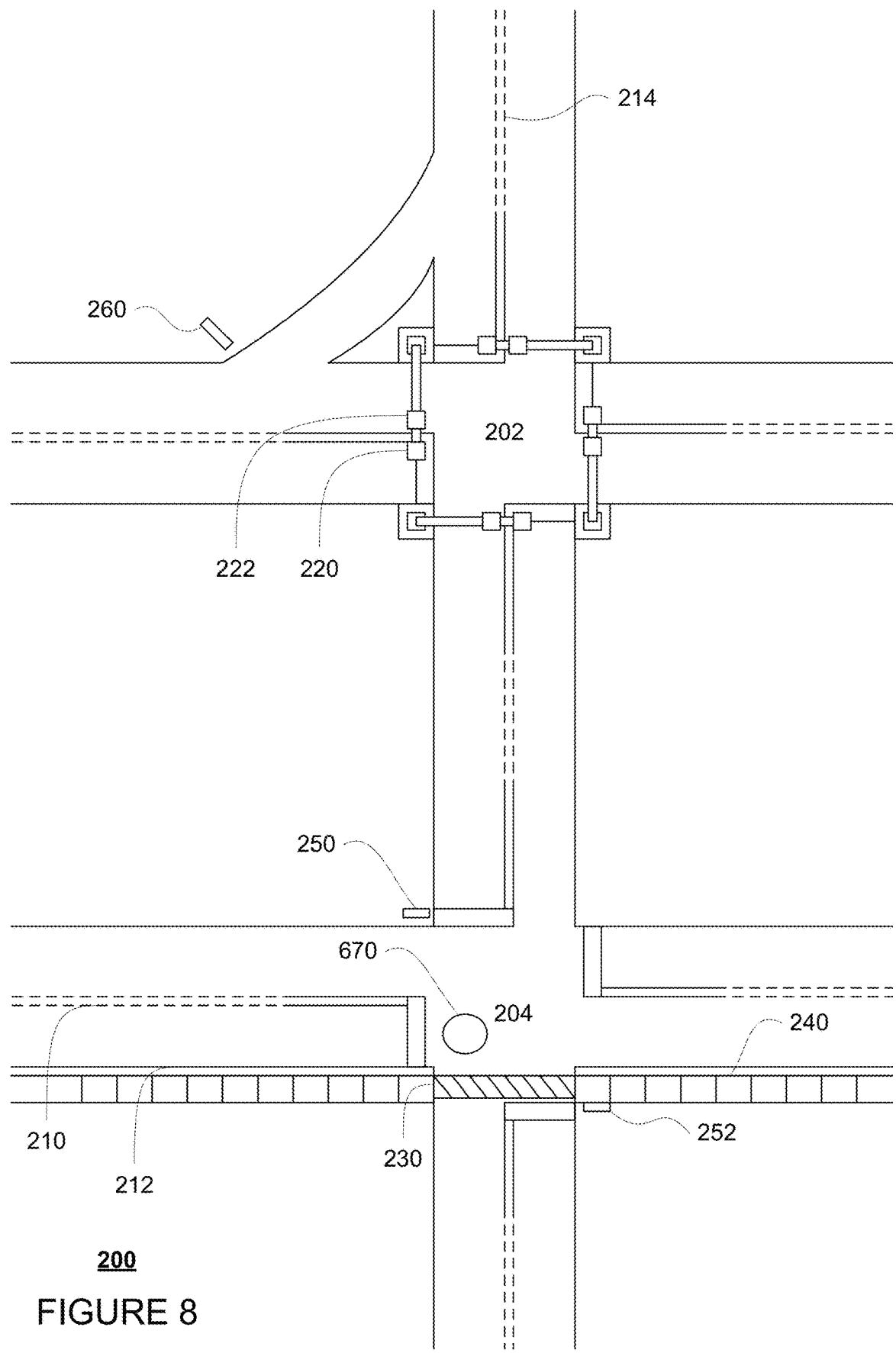
FIG. 8 is an example of map information in accordance with aspects of the disclosure.

In addition to adding new puddles to the map information, the server computing devices 410 may also remove old puddles. In some instances, this may be done after a period of time has expired. This period of time may be determined based on circumstances such as how long it has been since the last rain event (which can be extracted from the current date and time and the date and time of the end of the last rain event), how sunny it has been after a rain event, whether the area of a puddle is shaded, the current temperature, etc. as measured at the time that the puddle was first reported or last reported. Overtime, as more data is collected about puddles, their size and how long they last at specific locations more accurate, statistical or machine learned models may be used. For example, turning to FIG. 8, after some period of time, the server computing devices 410 may remove the puddle 672 from the map information 200 of the storage system 450. This information may then be broadcast, for example using network 460, to the autonomous vehicles of the fleet (e.g. vehicles 100, 100A), in order to enable these vehicles to remove the puddle 672 from the local version of the map information 200 at each respective vehicle.

In other instances, if a certain number of autonomous vehicles of the fleet, such as 2 or more or less, report that no puddle is detected where a puddle is included in the map information 200 of the storage system 450, this may be used to remove a puddle from the map information 200 of the storage system 450. In yet other instances, if a certain number of autonomous vehicles of the fleet, such as 2 or more or less, pass on a road with a mapped puddle and do not report a puddle on that road, this may be used to remove a puddle from the map information. Once a puddle is removed from the map information, a corresponding broadcast may go out, for example using network 460, to the autonomous vehicles of the fleet. (e.g. vehicles 100, 100A). As such, the computing devices of any autonomous vehicles that receive these updates may remove these puddles from their local map information.

Returning to FIG. 10, at block 1020, a miles per puddle rate is determined based on the received reports. As noted above, in addition to mapping puddles, the server computing devices 410 may also aggregate data received from the autonomous vehicles of the fleet and any other vehicles as discussed in the examples above in order to track a "miles per puddle" rate. This miles per puddle rate may correspond to the number of puddles observed by the autonomous vehicles of the fleet over a certain period of time or number of miles driven. The miles per puddle rate may thus be tracked over a certain window, such as the last 8 hours (or more or less) or a time since a last rain or other precipitation event started or ended. Thus, each time there is a new precipitation event, the window may be reset. A precipitation event may be determined from third party weather sources or information from the autonomous vehicles of the fleet such as the direct or indirect detection of precipitation. A direct example may include the perception system detecting rain, and an indirect example may include looking at the status of automatic wipers on the autonomous vehicles of the fleet. Alternatively, the window may be the last 150 miles or more or less driven by the autonomous vehicles of the fleet. Because the miles per puddle rate is determined using a window approach, the miles per puddle rate may be continuously updated by the server computing devices 410 as new information is received from the autonomous vehicles of the fleet (and/or other vehicles).

At block 1030 of FIG. 10, an operating policy for the fleet is determined based on the miles per puddle rate. The miles per puddle rate may then be used by the server computing devices 410 to make decisions for the autonomous vehicles of the fleet. For example, when the miles per puddle rate is greater than one or more first threshold values, the operation of the autonomous vehicles of the fleet or vehicles 100, 100A, may continue as normal. However, once the miles per puddle rate falls below any of these one or more first threshold values, the server computing devices 410 may implement operational policies or puddle driving policies. By doing so at the server computing devices 410 (rather than locally at each of the vehicles of the fleet), the server computing devices are able to aggregate data across a plurality of vehicles (including those of the fleet and other) and more readily provide an estimate of what the world currently looks like.

The one or more first threshold values may each be associated with an operational policy. Thus, different operational policies may have different threshold values. For instance, some operational policies may involve avoiding roads with speeds greater than 35 miles per hour or more or less. As another instance, operational policies may involve grounding (e.g. no longer allowing those types of autonomous vehicles to drive autonomously or at all) autonomous vehicles of certain types. For example, trucks may be allowed to continue to drive autonomously, but passenger vehicles such as small cars may be grounded. As another instance, some operational policies may involve allowing autonomous vehicles with one software version or newer or a particular piece of hardware to continue to drive autonomously, while other vehicles are grounded. As yet another instance, vehicles may be required to avoid certain areas with greater numbers of puddles (e.g. avoid all areas with X number of puddles per square mile, etc.). Other operational policies may limit an overall number of miles that can be driven by the autonomous vehicles of the fleet in an autonomous driving mode for a certain period of time. For example, if a particular type of event were to occur every Y number of miles, the overall number of miles may be limited to a fraction of Y miles. By doing so, this may reduce the likelihood of certain types of incidents, such as hydroplaning and driving through puddles occurring.

The one or more first threshold values may range from 0.01 to 100 miles per puddle and may be selected based upon the configuration of the vehicles of the fleet (e.g. how "well" the vehicles can respond to puddles), how risk-averse the operators (e.g. human operators) of the transportation service want to be with respect to driving when there are puddles (e.g. greater threshold values may be used when operators are more risk-averse), as well as the operational policies themselves (e.g. lower threshold values may be used for operational policies that have a greater impact on the transportation service). As an example, an operational policy for grounding certain vehicles may have a lower threshold than an operational policy for avoiding roads with speed limits of 65 miles per hour or more as the latter may have a lesser impact on the transportation service than the former. Of course, the reverse may also be true.

Returning to FIG. 10 at block 1040, an instruction is sent to one or more of the autonomous vehicles of the fleet in order to implement the operating policy. To facilitate an operational policy, the server computing devices may broadcast, for example using network 460, such instructions to the autonomous vehicles of the fleet (e.g. vehicles 100, 100A), which may receive the information and respond accordingly (i.e. implement the policy).

In some instances, the miles per puddle rate may be compared to a second threshold value. This second threshold value may be less than one or more first threshold values and may be used to implement an operational policy that results in the entire fleet of vehicles being grounded. In other words, when there are too many puddles around, the miles per puddle rate may drop below the second threshold value, and the fleet may be grounded. As with the one or more first threshold values, the second threshold value may range from 0.01 to 100 miles per puddle and may be selected based upon the configuration of the vehicles of the fleet as well as how conservative the operators of the service want to be with respect to driving when there are puddles. As an example, if the second threshold value is 3 miles per puddle, the first threshold values may be less than 3 miles per puddle, such as 5 miles per puddle or 10 miles per puddle. In this regard, over time as the capabilities of the fleet improve, this second threshold value and/or the one or more first threshold values may become infinitely small or zero.

When the miles per puddle rate is too low or less than the second threshold value, the server computing devices 410 may ground the autonomous vehicles of fleet, or rather, send a signal to all of the vehicles of the fleet (e.g. to both vehicles 100, 100A) to pull over and stop driving autonomously and/or return to a depot. If there is a driver in any of these autonomous vehicles, the driver may be asked to take manual control of the vehicle, and if needed, complete a trip for a passenger and/or cargo. If there is no driver, but there is a passenger, the autonomous vehicle may proceed to the passenger's destination and or pull over and wait for another vehicle to transport the passenger to the destination. In order to do so, the server computing devices may broadcast such instructions to the autonomous vehicles of the fleet (e.g. vehicles 100, 100A), for example using network 460. The autonomous vehicles may receive the information and respond accordingly. In such instances, it may be useful to have the autonomous vehicles operated in a manual mode while detecting puddles where possible to promote safety while still enabling the server computing devices to update the miles per puddle rate.

Once the miles per puddle fate falls below the one or more first threshold values but is still above the second threshold value, the server computing devices 410 may implement puddle driving policies as noted above. And, once the miles per puddle rate is below the first threshold value, the operation of the autonomous vehicles of the fleet may continue as normal or in other words, without the operating policies or by no longer implementing the operating policies.

In addition, the map information may be used to make deployment decisions in order to avoid areas with too many puddles having high severity values. This map information may also be shared with vehicles of a fleet of autonomous vehicles, such as vehicles 100, 100A, in order to better enable those autonomous vehicles to avoid puddles, and especially deeper or larger puddles. In this regard, the map may be used when determining a route between two locations and when selecting pick up and drop off locations at the vehicle.

Figure 9:
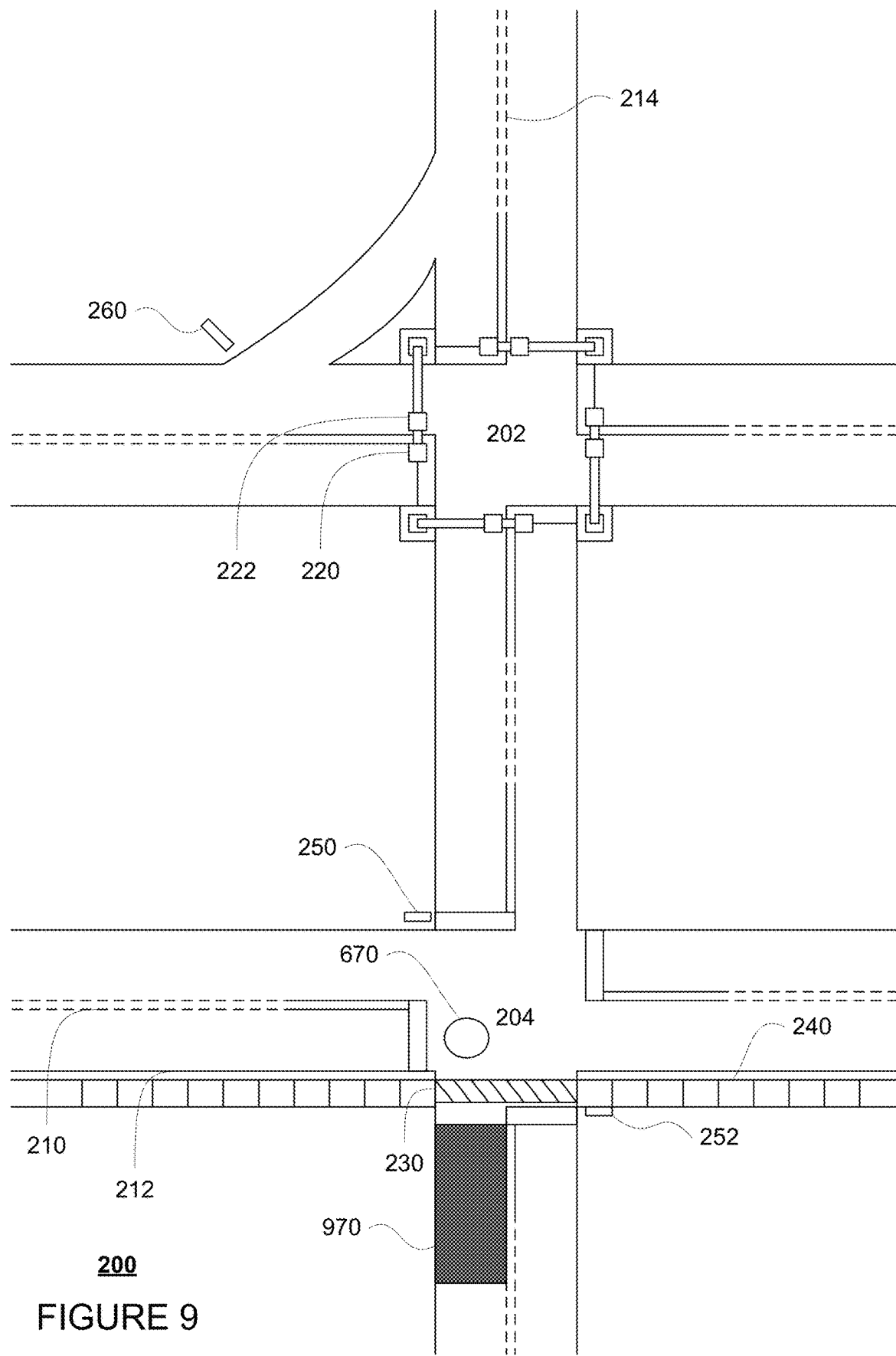
FIG. 9 is an example of map information in accordance with aspects of the disclosure.

In addition, for puddles of a certain size, the server computing devices 410 may automatically generate a "no-go region" in the map information 200 where the autonomous vehicles of the fleet are not permitted to drive. For example, for puddles that are reported as being larger than 2 meters in the direction of travel, which may be the case for puddle 672, the server computing devices 410 may automatically generate a no-go region such as no-go region 970 of FIG. 9. Such regions may be limited to a specific lane or lane in which the puddle is located (as shown in FIG. 9) or an entire road (e.g. in both driving directions). In order to do so, the server computing devices may broadcast such regions, for example using network 460, to the autonomous vehicles of the fleet (e.g. vehicles 100, 100A) which may receive the information, update the local versions of the map information 200 (as shown in FIG. 9), and respond accordingly. For example, the routing or planning systems may route vehicles 100, 100A in order to avoid or drive around the no-go region 970.

In order to avoid making fleetwide decisions on the basis of puddles which may not affect driving of autonomous or non-autonomous vehicles, only certain types of puddles may be mapped or reported. For example, puddles that are primarily confined to speed dips on roads with 35 mile per hour speed limits, such as residential areas like neighborhoods, may be excluded. Similarly, puddles that are present in corners of such foot speed dips or are directly adjacent to a curb or beyond a fog line, such as where vehicles do not need to pass through the puddle because it is not actually in a driving lane (e.g. it is outside of a driving lane), may also be excluded.

Although the examples above relate to a miles per puddle value, the inverse of this may also be used. As such, when a miles per puddle rate is determined, the inverse of the miles per puddle rate or a puddles per mile rate may also effectively be determined. However, the first and second threshold values would also need to be inverted for consistency. In this regard, when the puddles per mile meets a threshold value that is the inverse of any of the one or more first threshold values for implementing any of the aforementioned operational policies. If the puddles per mile rate is greater than a threshold that is the inverse of the second threshold value, the vehicles of the fleet may be grounded. In addition, over time as the capabilities of the fleet improve, the thresholds that are the inverse of the second threshold value and/or the inverse of the one or more first threshold values may become infinitely large.

In some instances, the dimensions of a puddle, and in particular the length of a puddle in the direction of traffic flow of a lane may be used to determine a percentage of puddle coverage. This percentage of puddle coverage may be used similarly to the miles per puddle value (or puddles per mile value if the inverse is used). For example, as the percentage of puddle coverage increases the drivable surface would decrease. At one or more first threshold percentages of coverage, the aforementioned operational policies may be implemented. As with the one or more first threshold values, the one or more first threshold percentages of coverage may be selected based upon the configuration of the vehicles of the fleet (e.g. how "well" the vehicles can respond to puddles), how risk-averse the operators (e.g. human operators) of the transportation service want to be with respect to driving when there are puddles (e.g. lower threshold values may be used when operators are more risk-averse), as well as the operational policies themselves (e.g. greater threshold percentages of puddle coverage may be used for operational policies that have a greater impact on the transportation service).

If the percentage of puddle coverage becomes too high, or greater than the second threshold percentage of coverage, the vehicles of the fleet may be grounded. As with the second threshold value, the second threshold percentage of coverage may be selected based upon the configuration of the vehicles of the fleet as well as how conservative the operators of the service want to be with respect to driving when there are puddles. In addition, over time as the capabilities of the fleet improve, the second threshold percentage of coverage and/or the one or more first threshold percentages of coverage may become infinitely large.

The features described herein may provide for a useful and practical approach to real time mapping of puddles. As noted above information can be used, among other things, to understand the extent and nature of puddles and dampness on roads post rain, which in turn, can be used to manage operation of autonomous vehicles.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for managing a fleet of autonomous vehicles that do not require a human driver, the method comprising:
   receiving, by one or more server computing devices, from a plurality of the autonomous vehicles of the fleet, reports identifying locations of detected puddles and a number of miles driven by the plurality of the autonomous vehicles of the fleet;
   determining, by the one or more server computing devices, a puddle rate based on an aggregation of the received reports, wherein the puddle rate corresponds to a number of miles driven per puddle;
   determining, by the one or more server computing devices, an operating policy for the fleet based on the puddle rate; and
   sending, by the one or more server computing devices, to the autonomous vehicles of the fleet in order to implement the operating policy.

2. The method of claim 1, further comprising receiving an addition report from a vehicle operated by a driver in a manual driving mode, and wherein the puddle rate is further based on the additional report.

3. The method of claim 1, wherein the reports further include dimensions of the detected puddles, and the method further comprises:
   determining a no-go region where the autonomous vehicles of the fleet are not permitted to drive based on dimensions of one of the detected puddles; and
   sending, by the one or more server computing devices, the no-go region to the autonomous vehicles of the fleet in order to cause the autonomous vehicles of the fleet to avoid the no-go region.

4. The method of claim 1, wherein the reports exclude puddles located in certain types of areas.

5. The method of claim 4, wherein the certain types of areas include speed dips in residential areas.

6. The method of claim 4, wherein the certain types of areas include areas outside of driving lanes.

7. The method of claim 1, further comprising incorporating the detected puddles into map information.

8. The method of claim 7, further comprising, sending information about the detected puddles to ones of the autonomous vehicles of the fleet in order to cause the ones to update local versions of the map information at the ones.

9. The method of claim 8, further comprising:
   receiving from a predetermined number of the autonomous vehicles of the fleet a report that one of the detected puddles of the local versions of the map information is no longer detected; and
   in response to receiving from the predetermined number of the autonomous vehicles of the fleet a report that the one of the detected puddles of the local versions of the map information is no longer detected, removing the one of the detected puddles from the map information.

10. The method of claim 9, further comprising sending information about the removed one of the detected puddles to the ones in order to cause updates to the local versions of the map information at the ones.

11. The method of claim 7, further comprising after a period of time, removing a detected puddle from the map information.

12. The method of claim 11, further comprising sending information about the removed detected puddle to ones of the autonomous vehicles of the fleet in order to cause updates to local versions of the map information at the ones.

13. The method of claim 7, further comprising:
   monitoring locations of the autonomous vehicles of the fleet over time;
   determining, based on the monitoring, when a predetermined number of the autonomous vehicles of the fleet have passed one of the detected puddles in the map information without reporting a detected puddle; and
   when the predetermined number of the autonomous vehicles of the fleet have passed one of the detected puddles in the map information without reporting a detected puddle, removing the one of the detected puddles from the map information.

14. The method of claim 13, further comprising sending information about the removed one of the detected puddles to ones of the autonomous vehicles of the fleet in order to cause updates to local versions of the map information at the ones.

15. The method of claim 1, wherein the puddle rate is determined further based on a window corresponding to the number of miles driven by the autonomous vehicles of the fleet.

16. The method of claim 1, wherein the puddle rate is determined further based on a window corresponding to a period of time since a last precipitation event.

17. The method of claim 1, wherein the puddle rate is determined further based on a window corresponding to a fixed period of time.

18. The method of claim 1, further comprising, continuously updating the puddle rate as new reports of detected puddles are received from the autonomous vehicles of the fleet.

19. The method of claim 1, wherein determining the operating policy includes comparing the puddle rate to a threshold value.

20. The method of claim 19, further comprising:
   determining when the updated puddle rate does not meet the threshold value; and
   when the updated puddle rate is determined to not meet the threshold value, sending, by the one or more server computing devices, an instruction to one or more of the autonomous vehicles of the fleet in order to no longer implement the operating policy.

21. The method of claim 1, wherein the operational policy includes grounding the autonomous vehicles of the fleet.

* * * * *